US010333963B2

(12) United States Patent
Pope et al.

(10) Patent No.: US 10,333,963 B2
(45) Date of Patent: Jun. 25, 2019

(54) IDENTIFYING A VULNERABILITY OF AN ASSET OF A NETWORK INFRASTRUCTURE TO MITIGATE

(71) Applicant: Corax Cyber Security, Inc., San Francisco, CA (US)

(72) Inventors: Jonathan Pope, London (GB); Lewis Guignard, Charlotte, NC (US); Thomas Beale, San Francisco, CA (US)

(73) Assignee: Corax Cyber Security, Inc., San Francisco, CA (US)

( * ) Notice: Subject to any disclaimer, the term of this patent is extended or adjusted under 35 U.S.C. 154(b) by 210 days.

(21) Appl. No.: 15/338,192

(22) Filed: Oct. 28, 2016

(65) Prior Publication Data
US 2018/0124092 A1 May 3, 2018

(51) Int. Cl.
*G06F 15/18* (2006.01)
*H04L 29/06* (2006.01)
*G06F 21/57* (2013.01)
*G06F 15/177* (2006.01)

(52) U.S. Cl.
CPC ........ *H04L 63/1433* (2013.01); *G06F 21/577* (2013.01); *H04L 63/20* (2013.01)

(58) Field of Classification Search
CPC .... H04L 63/20; H04L 63/1433; G06F 21/577
USPC .......................................................... 726/25
See application file for complete search history.

(56) References Cited

U.S. PATENT DOCUMENTS

| 6,026,198 | A   | * | 2/2000 | Okada ..................... G06T 9/005 341/107 |
| 6,539,464 | B1  | * | 3/2003 | Getov .................... G06F 9/5016 711/147 |
| 9,246,684 | B2  | * | 1/2016 | Barletta ................... G09C 1/00 726/1 |
| 9,325,732 | B1  | * | 4/2016 | Stickle ................ H04L 63/1408 726/1 |
| 9,584,536 | B2  | * | 2/2017 | Nantel ................ H04L 63/1425 726/1 |
| 2005/0050322 | A1 | * | 3/2005 | Mizrah ................. H04L 9/0822 713/168 |
| 2005/0050323 | A1 | * | 3/2005 | Mizrah ................. H04L 9/0844 713/168 |
| 2005/0050328 | A1 | * | 3/2005 | Mizrah ................. H04L 9/3273 713/171 |
| 2008/0040455 | A1 | * | 2/2008 | MacLeod .................. G06F 8/61 709/220 |
| 2012/0224057 | A1 | * | 9/2012 | Gill ........................ G06F 21/55 348/143 |
| 2013/0232305 | A1 | * | 9/2013 | Cuthbert, II ........ H03M 7/3059 711/154 |

(Continued)

*Primary Examiner* — Haresh N Patel
(74) *Attorney, Agent, or Firm* — Lowenstein Sandler LLP (57) ABSTRACT

A first vulnerability that is associated with one or more nodes of a network graph that represent one or more assets of a network infrastructure may be identified. Furthermore, a second vulnerability that is associated with one or more nodes of the network graph may be identified. A determination may be made as to whether the first vulnerability or the second vulnerability contributes more to a probability of a security breach associated with the network infrastructure. A notification may be provided to mitigate the vulnerability that contributes more to the probability of the security breach associated with the network infrastructure.

17 Claims, 8 Drawing Sheets

(56) References Cited

U.S. PATENT DOCUMENTS

| | | | |
|---|---|---|---|
| 2013/0298184 A1* | 11/2013 | Ermagan | G06F 21/54 726/1 |
| 2016/0205126 A1* | 7/2016 | Boyer | H04L 63/1433 726/25 |
| 2016/0330125 A1* | 11/2016 | Mekkattuparamban | H04L 47/20 726/1 |
| 2016/0371489 A1* | 12/2016 | Puri | G06F 17/30563 726/1 |

\* cited by examiner

IDENTIFYING A VULNERABILITY OF AN ASSET OF A NETWORK INFRASTRUCTURE TO MITIGATE

TECHNICAL FIELD

The present disclosure is generally related to network infrastructure, and more particularly, to identifying a vulnerability of an asset of a network infrastructure to mitigate and a control to implement the mitigation of the vulnerability.

BACKGROUND

A computing asset (e.g., a desktop computer or laptop computer) may be attacked by an unauthorized entity. For example, the unauthorized entity may access protected or confidential data of the computing asset by exploiting weaknesses or vulnerabilities of the computing asset. Such vulnerabilities may correspond to an exploit that takes advantage of a known weakness of the software that is run by the computing asset to cause an unintended behavior for the software or the computing asset. The unintended behavior may allow the unauthorized entity to gain control of the computing asset and to access the protected or confidential data of the computing asset or to use the computing asset for purposes other than its owner's original intentions.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Aspects of the present disclosure relate to identifying a vulnerability of an asset of a network infrastructure to mitigate. A network infrastructure may include multiple computing assets such as servers, computing devices, mobile devices (e.g., smartphones), etc. and networks that couple the computing assets with one or more other computing assets of the network infrastructure.

The assets of the network infrastructure may be associated with vulnerabilities that may be exploited by an unauthorized entity and result in a security breach of the network infrastructure. The unauthorized entity (i.e., an attacker) may seek to obtain secure data stored on one of the assets of the network infrastructure by exploiting one or more vulnerabilities of one or more assets of the network infrastructure. For example, a first computing device of the network infrastructure may be breached (i.e., compromised) or attacked by the unauthorized entity that exploits a vulnerability of the first computing device. Subsequently, a network that couples the first computing device to a first server of the network infrastructure may be used to attack the first server based on another vulnerability of the first server to obtain control of the first server or obtain other such information (e.g., log-in information) stored at the first server. Next, the unauthorized entity may access another network from the first server to attack a second server and gain access to the secure data that is stored at the second server. Thus, the security breach may be a result of the unauthorized entity exploiting multiple vulnerabilities of different assets of the network infrastructure.

The vulnerabilities of the assets of the network infrastructure may be mitigated to reduce the probability of a successful security breach of the network infrastructure. For example, an administrator of the network infrastructure may provide or install a software update to the software run by the first computing device, first server, or second server to mitigate known vulnerabilities or weaknesses of the software of the respective assets of the network infrastructure. However, the resources of the administrator may be limited. For example, the costs to mitigate a vulnerability of the asset or the time of the administrator may be limited. Thus, the administrator may wish to prioritize the mitigation of a vulnerability of the network infrastructure by addressing a vulnerability that contributes more to the probability of a successful security breach of the network infrastructure as opposed to another vulnerability that contributes less to the probability of a successful security breach. However, determining which vulnerability that should be mitigated when prioritizing resources may be difficult for the administrator when the network infrastructure includes a large number of assets with different vulnerabilities and options to mitigate the vulnerabilities.

Aspects of the present disclosure address the above and other deficiencies by providing a recommendation to mitigate a vulnerability out of multiple vulnerabilities that are associated with assets of a network infrastructure. The network infrastructure may be represented by a network graph (e.g., a Bayesian network) with multiple nodes where each node corresponds to an asset or a resource of the network infrastructure. Such assets or resources may include, but are not limited to, a network, a component of an information technology (IT) infrastructure such as servers, computers, and cellular phones, a storage server that is storing data, or any other type of component used in a network infrastructure. Thus, the network graph may represent every asset of the network infrastructure where each node of the network graph represents one of the assets of the network infrastructure. The network graph may further include nodes that represent entities associated with a use of the network infrastructure.

The nodes of the network graph may be connected by edges that represent a relationship between pairs of nodes. For example, an edge between a first node (e.g., a server) and a second node (e.g., a computer that accesses the server) may represent a relationship between the first node and the second node (e.g., the computer is capable of accessing the server). Thus, edges may connect each node that represents an asset with another node that represents another asset that accesses or can access the asset.

A probability or likelihood of a security breach for each of the assets of the network infrastructure may be determined by using the network graph that represents each asset of the network infrastructure. For example, each node representing a particular asset may be identified and a probability or likelihood for the particular asset represented by the node being subjected to a successful security breach may be determined based on vulnerabilities that are assigned to each of the nodes and controls that are applied to mitigate vulnerabilities of the asset. For example, each vulnerability that is assigned to a particular node that represents an asset of the network infrastructure may be associated with a value that contributes to the determining of the probability of the successful security breach. After each probability of a successful security breach for each node is determined based on the vulnerabilities assigned to each node and their respective values, a particular vulnerability that contributes more to the probability of a successful security breach at the network infrastructure may be identified. For example, a first vulnerability may contribute a first amount to a probability of a successful security breach for a single asset of the network infrastructure. A second vulnerability may contribute a second amount to a probability of a successful security breach to each of ten different assets of the network infrastructure. If the first amount exceeds the accumulation of the second amount to each of the ten different assets, then the first vulnerability at the first asset may be identified as a recommended vulnerability to address by the administrator of the network infrastructure. Otherwise, if the accumulated second amount exceeds the first amount, then the second vulnerability that is present at the different assets may be identified as the recommended vulnerability to be addressed by the administrator. A recommendation of a particular control to mitigate the vulnerability may be provided.

Thus, aspects of the present disclosure may provide a more efficient application of security measures for assets of a network infrastructure by determining a particular vulnerability that contributes more to the probability of a successful security breach for assets within network infrastructure. Such a determination may be based on the characteristics of the assets of the network infrastructure and the use of a network graph to identify the particular vulnerability that contributes more to the probability of a successful security breach of the assets of the network infrastructure. A recommendation may be provided to mitigate the vulnerability.

Figure 1:
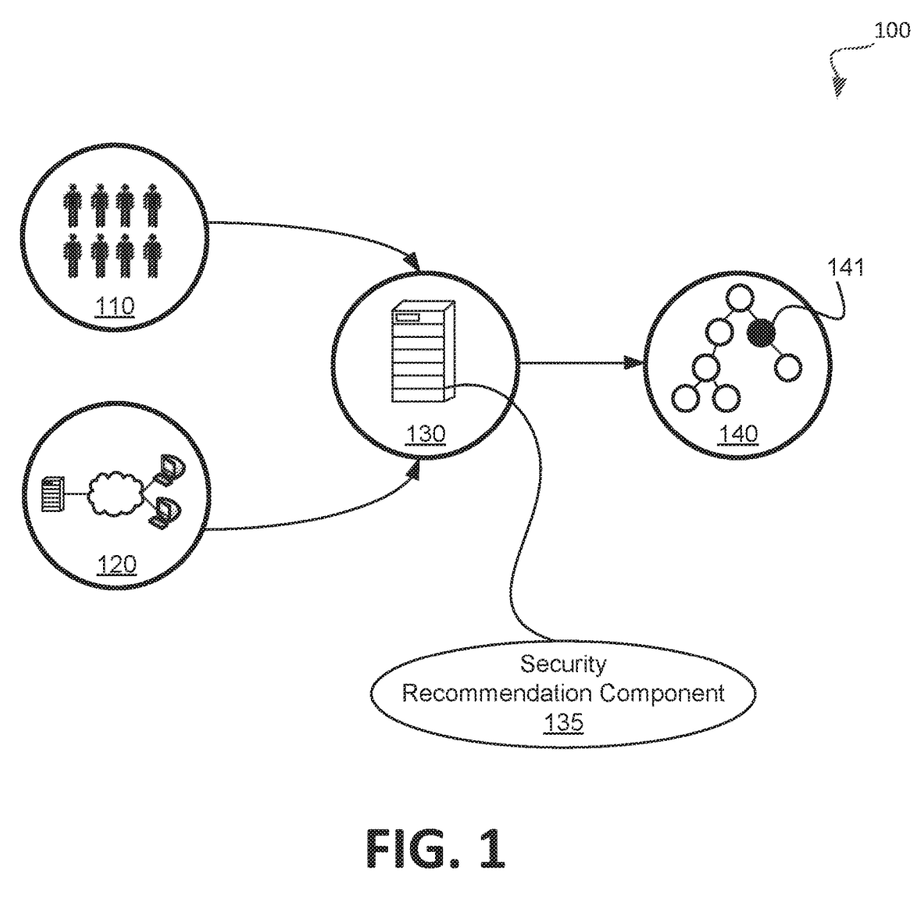
FIG. 1 illustrates an example environment to identify a vulnerability of an asset of a network infrastructure to be mitigated in accordance with some embodiments of the present disclosure.

FIG. 1 illustrates an example environment 100 to identify a vulnerability of an asset of a network infrastructure to mitigate. In general, the environment 100 may include a security recommendation component 135 that receives data associated with a network infrastructure and generates a network graph used to identify a vulnerability of one or more assets of the network infrastructure that contributes more to a probability of a successful security breach for the network infrastructure than another vulnerability.

As shown in FIG. 1, the environment 100 may include the security recommendation component 135 of a server 130 that receives various types of data associated with a network infrastructure. For example, the security recommendation component 135 may receive entity data 110 and assets data 120. The entity data 110 may identify one or more entities that are associated with a use of the network infrastructure. For example, the entity data 110 may identify, but is not limited to, one or more corporations, organizations under the corporations (e.g., a sales department, information technology (IT) department, etc.), third party entities (e.g., other organizations providing external servers or external resources to the network infrastructure), and personnel (e.g., records identifying employees of the company). The entity data 110 may identify additional information for each of the entities. For example, the entity data 110 may identify a geographic region for the entities (e.g., a country geographic location for a corporation), a size of an entity (e.g., the number of employees assigned to the entity), an industry sector associated with the entity, etc. The assets data 120 may specify assets of the network infrastructure. For example, the assets data 120 may identify networks used in the network infrastructure, servers, computers, mobile devices, storage resources storing data, or any other type of hardware component, resource, or asset of a network infrastructure.

Referring to FIG. 1, a server 130 may include the security recommendation component 135. The server 130 may be a processing device such as, but is not limited to, a desktop computer, a laptop computer, a mainframe computer, a personal digital assistant, a rack-mount server, a hand-held device or any other device configured to process data. The server 130 may receive the entity data 110 and the assets data 120 via a network from one or more other servers or processing devices.

Furthermore, the security recommendation component 135 may generate a network graph 140 based on the entity data 110 and the assets data 120. The network graph may be a graphical structure or representation of the network infrastructure and one or more entities associated with the network infrastructure. In some embodiments, the network graph may be a directed acyclic graph such as a Bayesian network. As described in further detail below, the network graph may include multiple nodes where each node represents an entity or an asset of the network infrastructure. Thus, the network graph may represent the network infrastructure and the relationships between assets of the network infrastructure as well as the relationships between the assets of the network infrastructure and entities associated with the network infrastructure. The probability, likelihood, or an assessment of a successful security breach of the assets of the network infrastructure may be determined by using the network graph generated by the security recommendation component 135. Furthermore, the security recommendation component 135 may identify a particular vulnerability that contributes more to the probability of the successful security breach of the network infrastructure than another vulnerability. For example, a particular node 141 may be identified as having a particular vulnerability that contributes more to the probability of a successful security breach for the network infrastructure as opposed to another vulnerability associated with another node that represents another asset of the network infrastructure.

Figure 2:
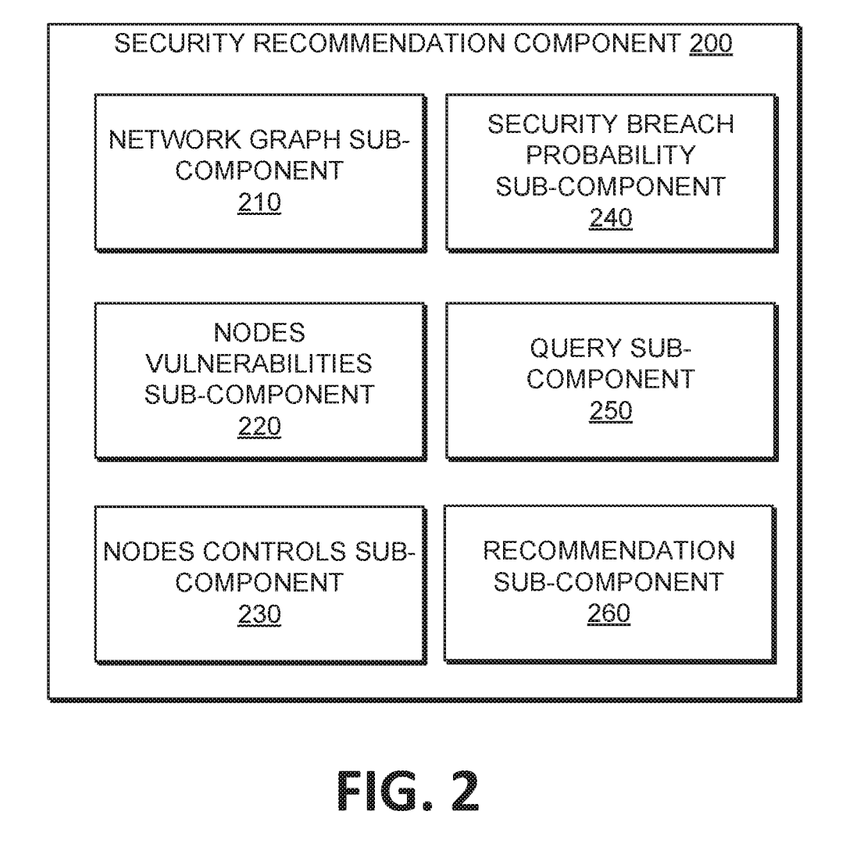
FIG. 2 is a block diagram of an example security recommendation component in accordance with some embodiments of the present disclosure.

FIG. 2 is a block diagram of an example security recommendation component 200. In general, the security recommendation component 200 may generate a network graph based on assets and entities of a network infrastructure and may provide a recommendation to mitigate a particular vulnerability of the assets of the network infrastructure based on the network graph. The security recommendation component 200 may correspond to the security recommendation component 135 of FIG. 1. Furthermore, the security recommendation component 200 may include a network graph sub-component 210, a nodes vulnerabilities sub-component 220, a nodes controls sub-component 230, a security breach probability sub-component 240, a query sub-component 250, and a recommendation sub-component 260. In alternative embodiments, the functionality of one or more of the sub-components may be combined or divided.

As shown in FIG. 2, the security recommendation component 200 may include the network graph sub-component 210 that may receive entity data and assets data that identify entities and assets of the network infrastructure and may generate a network graph (e.g., a Bayesian network) based on the received data. Furthermore, the security recommendation component 200 may include a nodes vulnerabilities sub-component 220 that may identify the vulnerabilities associated with each of the nodes of the network graph. As described in further detail below, each vulnerability may contribute a certain amount or a certain percentage to a probability that the respective node will be subjected to a successful security breach (i.e., the assessment of the security breach for the node). The security recommendation component 200 may further include a nodes controls sub-component 230 that may identify controls that are associated with each of the nodes of the network graph. For example, a control may correspond to a software or hardware capability of the asset represented by the respective node that is enabled to mitigate one of the vulnerabilities of the respective asset. Furthermore, the security breach probability sub-component 240 may determine a probability of a successful security breach for each of the nodes. The probability of the successful security breach may be based on a combination of the vulnerabilities and controls associated with a particular node as well as other vulnerabilities and other controls associated with other nodes that are connected with the particular node. Further details with regard to nodes are described in conjunction with FIGS. 4A and 4B.

The security recommendation component 200 may further include a query sub-component 250 that may receive a request from a user or administrator of the network infrastructure to provide an assessment associated with a security breach for the assets of the network infrastructure. The query may correspond to a request to provide the assessment of the security breach for a portion of the network infrastructure. For example, the query may specify a subset or a portion of the network infrastructure that is associated with a particular group (e.g., an entity) that uses a particular portion of the network infrastructure and to provide a security recommendation based on the assets in the particular portion of the network infrastructure. The recommendation sub-component 260 may identify a particular vulnerability that contributes more, or the most, to the probability of a successful security breach to assets of the network infrastructure. In some embodiments, the recommendation sub-component 260 may identify a particular control that is available for one or more assets of the network infrastructure that may reduce the probability of the successful security breach to assets of the network infrastructure.

Figure 3:
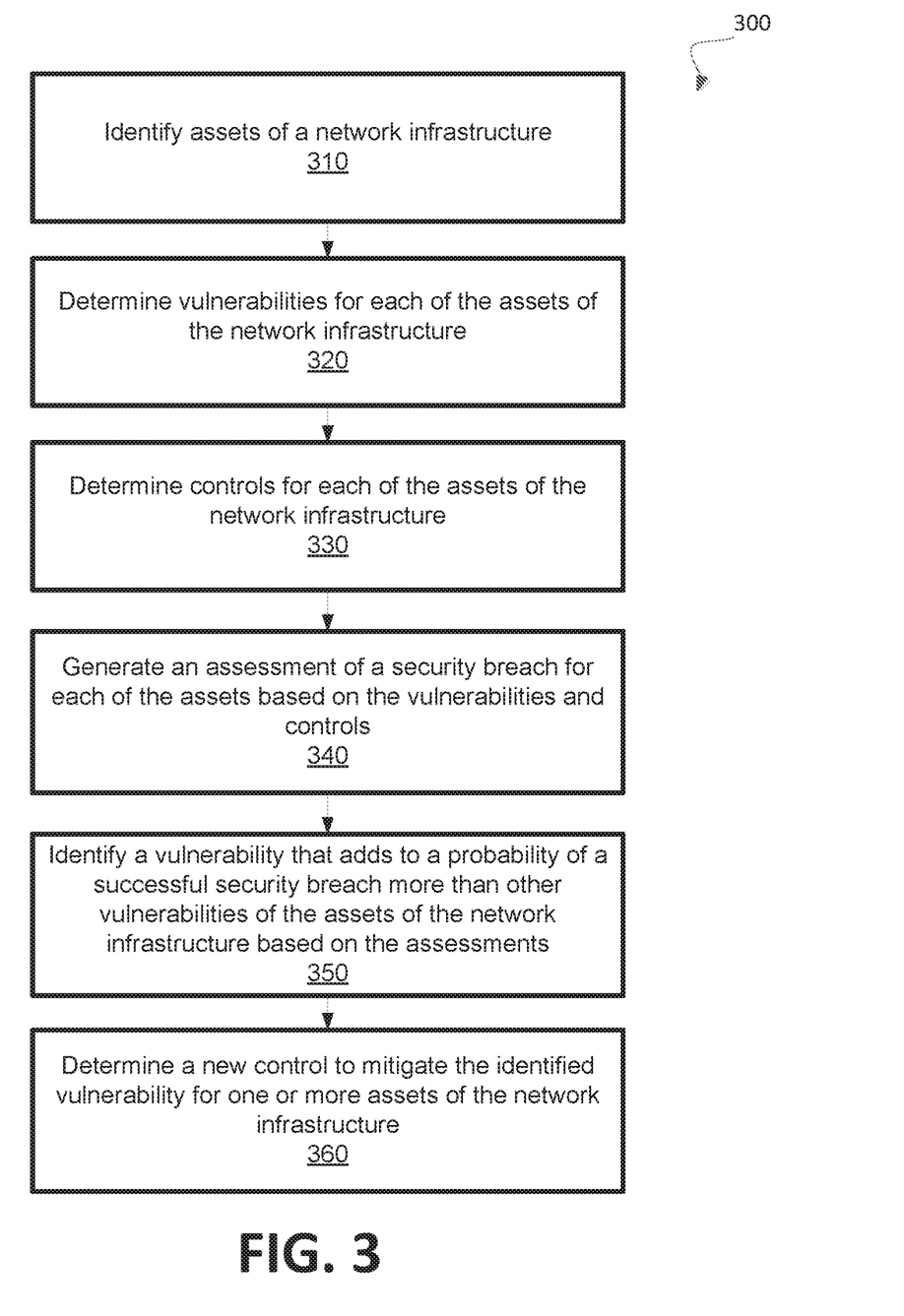
FIG. 3 is a flow diagram of an example method to determine a new control to apply to mitigate a vulnerability for an asset of a network infrastructure in accordance with some embodiments.

FIG. 3 is a flow diagram of an example method 300 to determine a new control to apply to mitigate a vulnerability for an asset of a network infrastructure. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. The security recommendation component 135 of FIG. 1 may perform the method 300.

As shown in FIG. 3, the method 300 may begin with the processing logic identifying assets of a network infrastructure (block 310). The identification of the assets of the network infrastructure may correspond to identifying nodes that represents the assets in a network graph. For example, the nodes may be identified in a Bayesian network that represents the network infrastructure. Further details with regard to the network graph are described in conjunction with FIGS. 4A and 4B. The processing logic may further determine vulnerabilities for each of the assets of the network infrastructure (block 320). In some embodiments, the nodes that represent assets of a network infrastructure may include a label or an identification of the vulnerabilities that are assigned to the asset represented by the respective node. For example, as previously described, assets data may be received. The assets data may identify one or more software and hardware characteristics of a particular asset. In some embodiments, the characteristics may include, but are not limited to, a hardware configuration, software version, types of hardware devices used by the asset, operating system version used by the asset, software applications and the versions of the software applications run or executed by the asset, etc. The vulnerabilities assigned known for each of the hardware or software characteristics may be identified from a database or a data store and may be assigned to the node representing the asset when the characteristics of the asset matches with the hardware or software characteristics associated with the vulnerability. Each vulnerability may correspond to a software or hardware characteristic of the respective asset represented by the node that may be exploited by a security breach. In some embodiments, each vulnerability may be assigned a value or a score that may represent an amount that the vulnerability may contribute to the probability of a successful security breach for the asset that is associated with the vulnerability or an amount that the vulnerability may contribute to the impact of a successful security breach for the asset. Further details with regard to such values assigned to vulnerabilities re described in conjunction with FIG. 4B.

The processing logic may further determine controls for each of the assets of the network infrastructure (block 330). The controls of each asset may be identified from the assets data that includes information of the assets of the network infrastructure. For example, the nodes that represent the assets of the network infrastructure may further include a label or an identification of the controls that are active or enabled to mitigate vulnerabilities. Each control may be assigned a value or a score that may represent an amount that the control contributes to the reduction of a probability of a successful security breach for the asset that is associated with the vulnerability. The controls may be identified based on the characteristics of the asset or the type of device of the asset.

Furthermore, the processing logic may generate an assessment of a security breach for each of the assets of the network infrastructure based on the vulnerabilities and the controls (block 340). The assessment may be generated based on values associated with a security breach for each of the assets of the network infrastructure. The assessment of the security breach may indicate a likelihood or probability that the identified asset will be compromised by a successful security breach by an unauthorized entity. The assessment may be generated based on a Bayesian network (e.g., a Directed Acyclic Graph) and a joint probability distribution of the values of the nodes of the Bayesian network that uses the conditional probability tables for the node representing the identified asset and the nodes representing the one or more entities associated with the identified asset and the nodes representing the additional assets that are associated with the identified asset.

Referring to FIG. 3, the processing logic may further identify a vulnerability that adds to a probability of a successful security breach more than other vulnerabilities of assets of the network infrastructure based on the assessments of the security breach for each of the assets (block 350). The vulnerability may be identified based on an amount that the vulnerability contributes to the probability of a successful security breach for multiple assets. Further details with regard to identifying the vulnerability that adds more to the probability of a successful security breach are described in conjunction with FIG. 5. Furthermore, the processing logic may determine a new control to mitigate the identified vulnerability (block 360). For example, a control that may be applied to assets that are associated with the identified vulnerability may be recommended to mitigate the identified vulnerability. Further details with regard to identifying the new control are described in conjunction with FIG. 6.

As such, multiple assets of a network infrastructure may be identified. The network infrastructure may be represented by a network graph that includes a node for each asset (and entity) of the network infrastructure. Each of the assets may be associated with one or more vulnerabilities and one or more controls. A probability of a successful security breach for each of the assets may be based on a combination of the vulnerabilities and controls. Each vulnerability may contribute a certain amount to the probability of the successful security breach for each asset that is associated with the vulnerability. The vulnerability that contributes the most or more to an increase in the probability of the successful security breach for all of the assets of the network infrastructure may be identified. A control to mitigate the vulnerability may be identified.

Figure 4A:
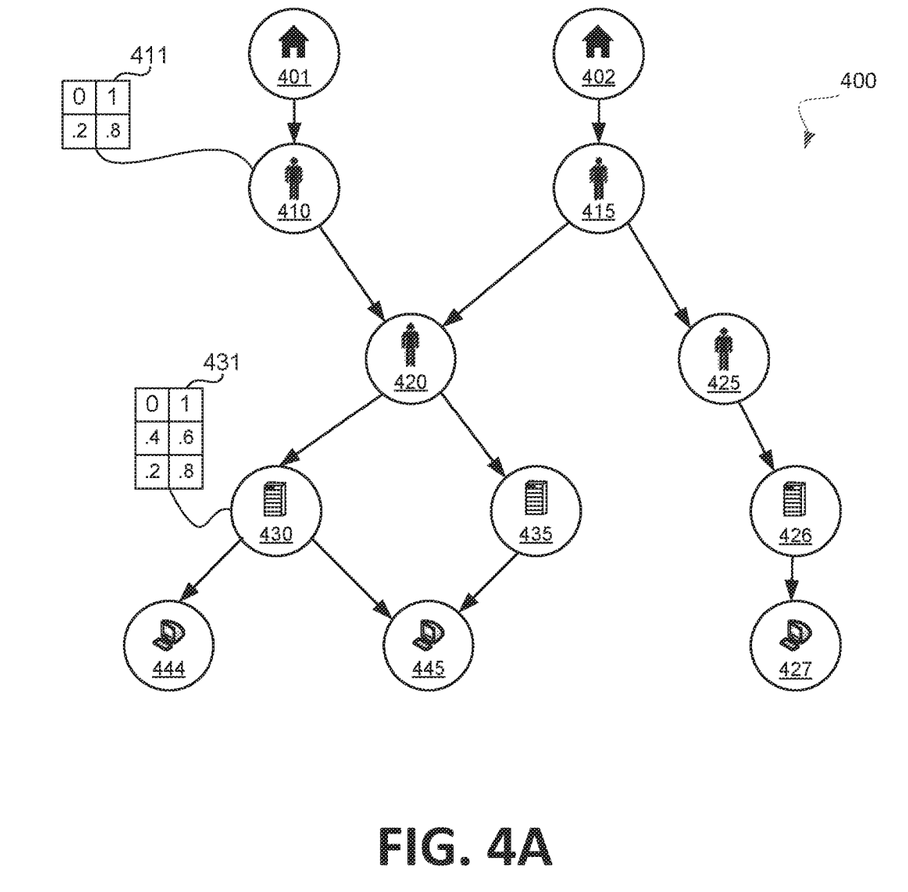
FIG. 4A illustrates an example network graph with nodes representing entities and assets of a network infrastructure in accordance with some embodiments of the present disclosure.

FIG. 4A illustrates an example network graph 400 with nodes representing entities and assets of a network infrastructure. In general, the network graph 400 may be generated by the security recommendation component 135 of FIG. 1.

As shown in FIG. 4A, the network graph 400 includes multiple nodes that represent entities associated with a network infrastructure and assets of the network infrastructure. For example, the node 410 and node 415 may represent corporate entities. As shown, the node 410 may represent a 'Company A' and the node 415 may represent the 'Company Subsidiary.' Furthermore, the node 420 may represent an organizational entity such as a 'Sales' department or organization. Since the node 420 is connected to the nodes 410 and 415 with the edges of the network graph, the nodes 410 and 415 may be considered parent nodes of the node 420. Such a relationship may indicate that each of the 'Company A' represented by the node 410 and the 'Company Subsidiary' represented by the node 415 uses the 'Sales' department represented by node 420. Furthermore, the node 425 may represent another organizational entity such as a 'Legal' department that is used by the 'Company Subsidiary' represented by the node 415.

Referring to FIG. 4A, the node 420 may be connected (e.g., by directed edges that point to the nodes) to the nodes 430 and 435 representing different servers of the network infrastructure. Furthermore, the nodes 440 and 445 may represent other assets of the network infrastructure such as mobile devices, desktop computers, laptop computers, or other such processing devices. For example, the server represented by node 430 is connected with edges to the device represented by the node 440 and the device represented by the node 445 while the server represented by the node 435 is connected by an edge to the node 445 but not the node 440. Thus, the server represented by the node 430 may be considered to be able to access or be accessed by the devices represented by the nodes 440 and 445 while the server represented by the node 435 may only be considered to access or be accessed by the device represented by the node 445. Similarly, the node 426 may represent another asset that is used by the 'Legal' organization represented by the node 425 and may be related to another asset represented by the node 427.

Each node may be associated with a conditional probability table. For example, a node representing an entity may be assigned a first type of conditional probability table that specifies a first value representing a low risk level and a second value representing a high risk level of the entity being subjected to an attack by an unauthorized entity. For example, the node 410 representing the entity 'Corporation A' may be assigned a conditional probability table 411 that specifies a first value of 0.2 that provides a measure as to whether the entity is at a low risk level and a second value of 0.8 that provides another measure as to whether the entity is at a high risk level of a security breach attack. Each of the entities may be associated with such a type of conditional probability table. For example, the nodes 415, 420, and 425 may each be associated with a different conditional probability table with additional first and second values. In some embodiments, the first and second values for each of the nodes representing an entity may be based on one or more factors including, but not limited to, a geographic region of the entity, a size or number of employees of the entity, an industry sector of the entity, a revenue of the entity, etc. For example, if a first entity is in the United States and the second entity is in the United Kingdom and if unauthorized entities are more likely to perform a security breach attack to entities located in the United States as opposed to entities located in the United Kingdom, then the first entity located in the United States may have a higher second value than the entity located in the United Kingdom.

Similarly, each asset of the network infrastructure may be assigned a second type of conditional probability table that specifies a first value representing a probability that the asset will not be compromised by a successful security breach and a second value representing a probability that the asset will be compromised by a successful security breach. For example, the node 430 may be assigned a conditional probability table 431 that specifies a first value of 0.4 that provides a measure as to whether the asset represented by the node 430 is not to be compromised and a second value of 0.6 that provides a measure as to whether the asset is likely to be comprised by a security breach. The conditional probability table 431 may further include values of a conditional probability table of a parent node (e.g., the node 410). Each of the nodes representing an asset of the network infrastructure may be associated with such a type of conditional probability table. For example, the nodes 426, 427, 430, 435, 440, and 445 may each be associated with a different conditional probability table with additional first and second values. In some embodiments, the first and second values for each of the nodes representing one of the assets of the network infrastructure may be based on one or more factors including, but not limited to, vulnerabilities of the asset, controls of the asset, type of the asset, an amount of data stored at the asset or accessed by the asset, type of data stored or accessed by the asset, etc. In some embodiments, vulnerabilities may correspond to known security flaws of the respective asset that may be exploited by an unauthorized entity in an attempt to perform a security breach of the asset. Examples of such vulnerabilities include, but are not limited to, a software bug, an older version of software, a SQL injection, etc. Thus, a vulnerability may be a security flaw associated with a configuration of the asset. A control may correspond to a mitigation of a security breach associated with the respective asset. For example, a control may be a capability of the asset to reduce the susceptibility of the respective asset to a security breach associated with one of the vulnerabilities. In some embodiments, the control may be a software or hardware feature of the asset that has been activated or enabled to provide additional security measure to mitigate or reduce the probability or likelihood of a successful security breach of the asset. Examples of a control may include, but are not limited to, a firewall, antivirus software installed on the asset, etc.

As an example, in order to generate an assessment of a security breach for the computing device represented by the node 444, conditional probability tables for each ancestor node (e.g., each node higher in the hierarchy of the network graph and connected with an edge in a path that includes the node) may be identified. For example, conditional probability tables for nodes 430, 420, 410, and 415 may be identified as each of these nodes may be in a path that includes the node 444. The assessment may be based on a combination of the conditional probability tables for each of the ancestor nodes and the conditional probability table for the node 444. For example, the assessment may be based on each combination of values of the conditional probability tables. In some embodiments, a first combination with respect to a conditional probability table may use one of the first and second value (e.g., the value represented by '0') and a second combination may use the other of the first and second value (e.g., the value represented by '1'). The assessment may use a joint probability function that provides a value that indicates the likelihood of a successful security breach for the asset.

Although the probability of a successful security breach for an asset is described above in conjunction with the network graph, other such assessments may be used with a joint probability function that uses conditional probability tables of a network graph. For example, values for the conditional probability tables of the nodes of the network graph may be used to determine an impact of a successful security breach for the respective node. In some embodiments, the impact may correspond to an amount of monetary cost that may result in a successful security breach of the respective asset that is represented by the respective node. Thus, each node may be assigned a first conditional probability table that relates to a likelihood of a successful security breach and a second conditional probability table that relates to an impact of a successful security breach. Further details with regards to the values that are used in the first and second conditional probability tables are described below in conjunction with FIG. 4B.

Although nodes representing entities and assets of a network infrastructure are described, the present disclosure may also be associated with nodes representing other objects such as physical buildings, employees, workspaces, etc. For example, as shown in FIG. 4A, additional nodes 401 and 402 may be connected, respectively, by edges to nodes 410 and 415. The nodes 401 and 402 may represent a physical building (e.g., physical buildings or workspaces that are associated with entities represented by child nodes or are locations of the assets of the network infrastructure represented by child nodes, etc.), specific employees, groups of employees, etc. Each node 401 and 402 may also be associated with a conditional probability table with values as previously described.

Figure 4B:
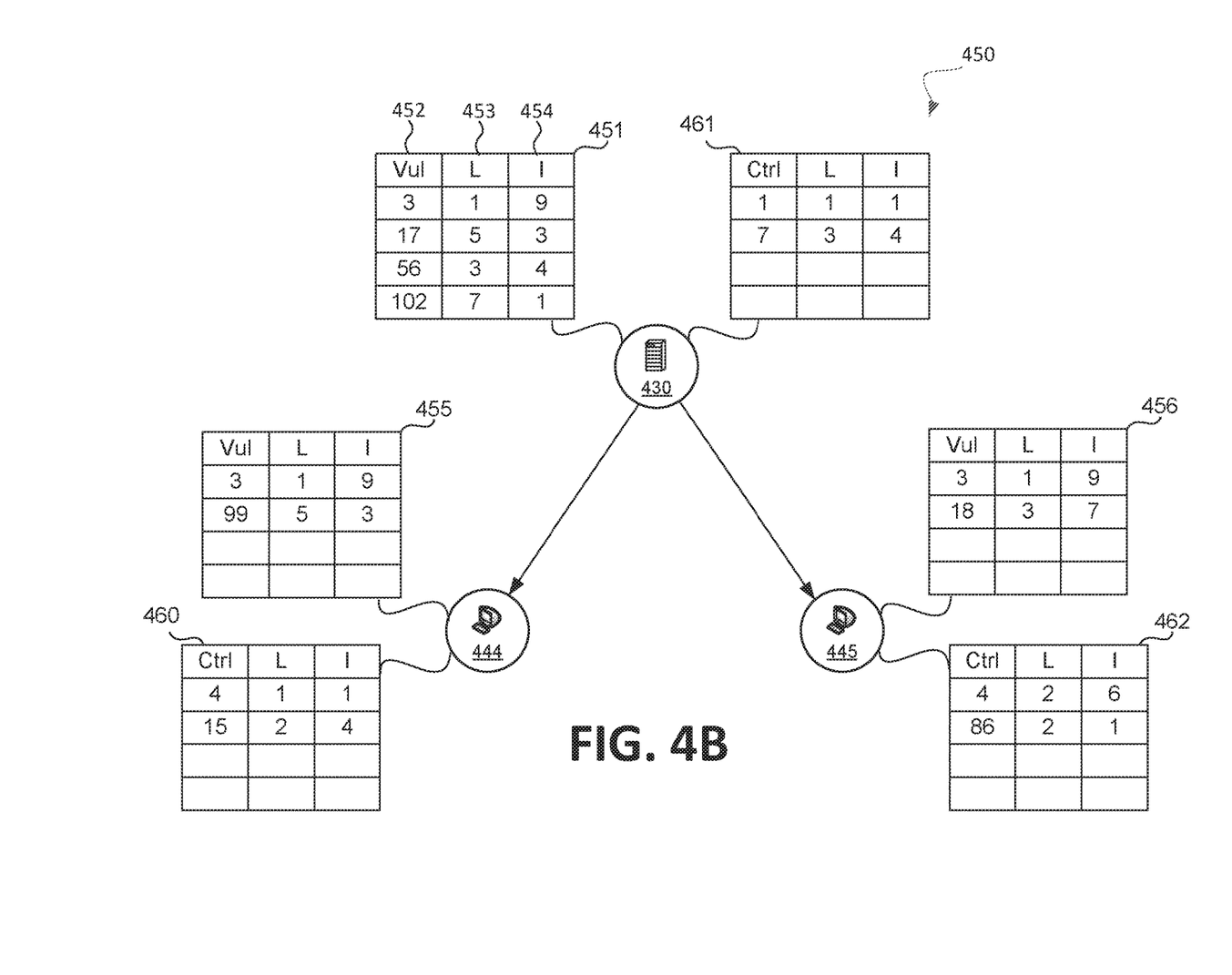
FIG. 4B illustrates an example portion of the network graph with nodes associated with vulnerabilities in accordance with some embodiments of the present disclosure.

FIG. 4B illustrates an example portion 450 of a network graph with nodes associated with vulnerabilities. In general, the portion 450 of the network graph may be generated by the security recommendation component 135 of FIG. 1.

As shown in FIG. 4B, the portion 450 of the network graph may correspond to a portion of the network graph 400 of FIG. 4A. For example, the portion 450 may include the nodes 430, 444, and 445. In general, each node may be assigned one or more vulnerabilities and a value or score for a likelihood of a successful security breach and another value or score for an impact of a successful security breach. For example, the node 430 may be assigned a table 451 with a column 452 that identifies vulnerabilities that are assigned to the node 430, a column 453 that specifies a value or a score that each vulnerability contributes to the likelihood of a successful security breach of the asset represented by the node 430, and a column 454 that specifies another value or score that each vulnerability contributes to the impact of a successful security breach of the asset represented by the node 430. For example, the node 430 that represents an asset of the network infrastructure may be assigned vulnerabilities 3, 17, 56, and 102 where each of the vulnerabilities is assigned a likelihood value or score and an impact value or score. In some embodiments, the likelihood value or score may be based on a known frequency of use of the vulnerability, a known frequency or use of the vulnerability with the type of asset represented by the node, or another factor or characteristic associated with the vulnerability. The impact value or score may be based on a known amount of damage or cost that the vulnerability may result in, the value or cost of the asset, the value or cost of data stored at the asset or that may be retrieved from the asset, etc.

The values of a conditional probability table for the node 430 that is used when determining an assessment of a probability of a successful security breach of the node 430 may use the values of the vulnerabilities in the table 451 with the values in column 453. Furthermore, the values of a conditional probability table for the node 430 that is used when determining an assessment of an impact of a successful security breach of the node 430 may use the values of the vulnerabilities in the table 451 with the values in the column 454. Thus, each node in the network graph that corresponds to an asset may be assigned one or more vulnerabilities where each vulnerability corresponds to a first value or score for use in determining a likelihood of a successful security breach and a second value or score for use in determining an impact of the successful security breach of the asset.

Referring to FIG. 4B, the node 444 may be associated with vulnerabilities 3 and 9 where the vulnerability 99 is assigned a higher value than the vulnerability 3 where the higher value indicates a higher contribution to the probability of the vulnerability resulting in a successful security breach of the asset represented by the node 444. However, the vulnerability 99 is associated with the node 444 and not the nodes 430 and 445. The vulnerability 3 may be assigned a value of 1 indicating a lower contribution to the probability of the vulnerability resulting in the successful security breach of the asset that is represented by the node 444. However, since the vulnerability 3 is assigned to each of the nodes 430, 444, and 445, the mitigation of the vulnerability 3 may result in a more secure network infrastructure than the mitigation of vulnerability 99. For example, the removal of the vulnerability 3 from each of the nodes 430, 444, and 445 may result in lower values or a modification in the conditional probability tables for each of the nodes and result in a lower likelihood of a successful security breach that is calculated by a joint probability function of the network graph after the modification of the conditional probability tables than the removal of the vulnerability 99 from the node 444. In some embodiments, the joint probability function may be calculated across the nodes of the network graph with the vulnerabilities 3 and 99 not being removed to generate a baseline probability of a successful security breach. Next, the joint probability function may be calculated across the nodes of the network graph with the vulnerability 3 removed from each of the nodes 430, 444, and 445 to generate a first probability and the joint probability function may be calculated again across the nodes of the network graph with the vulnerability 99 removed from the node 444 to generate a second probability. If the difference between the first probability and the baseline probability is larger than the difference between the second probability and the baseline probability, then the vulnerability 3 may be identified as a vulnerability to be mitigated that may provide more security (e.g., reduce the probability of a successful security breach more) than removing or mitigating the vulnerability 99.

As shown in FIG. 4B, each node may further be associated with a control table that specifies controls that have been enabled or applied for the respective asset represented by the respective node as well as values for each control that contributes to reducing or mitigating the likelihood of a successful security breach and the impact of a successful security breach. For example, as shown, the node 444 may be associated with a control table 460, the node 430 may be associated with another control table 461, and the node 445 may be associated with a third control table 462. Each of the control tables 460, 461, and 462 may represent the controls that have been enabled for the respective assets and how the control reduces the values of the vulnerabilities in the respective conditional probability table for the respective node. In some embodiments, the values for a particular control table may be based on the control that has been enabled or applied as well as the type of asset that is represented by the node. For example, as shown, the control table 460 may specify a control 4 and the control table 462 may specify the same control 4, but the control 4 may be associated with different values in the control tables 460 and 462. The values may be based on the type of asset represented by the node and/or the other controls that are enabled or implemented at the node. Thus, the control 4 on the control table 460 may reduce a likelihood of a successful security breach and an impact of the successful security breach by a different amount than the control 4 in the control table 462 reduces the likelihood of the successful security breach and the impact of the successful security breach for the asset represented by the node 445.

Furthermore, although the tables as described in FIG. 4B describe values for the likelihood of a successful security breach and the impact of a successful security breach, values representing other characteristics may also be used. For example, such values may correspond to a level of compliance with a particular standard or regulation (e.g., a privacy policy, legal policy, etc.) Thus, the values of the tables and the use of the probability conditional tables and joint probability function with the values of the tables may be based on other such metrics.

Figure 5:
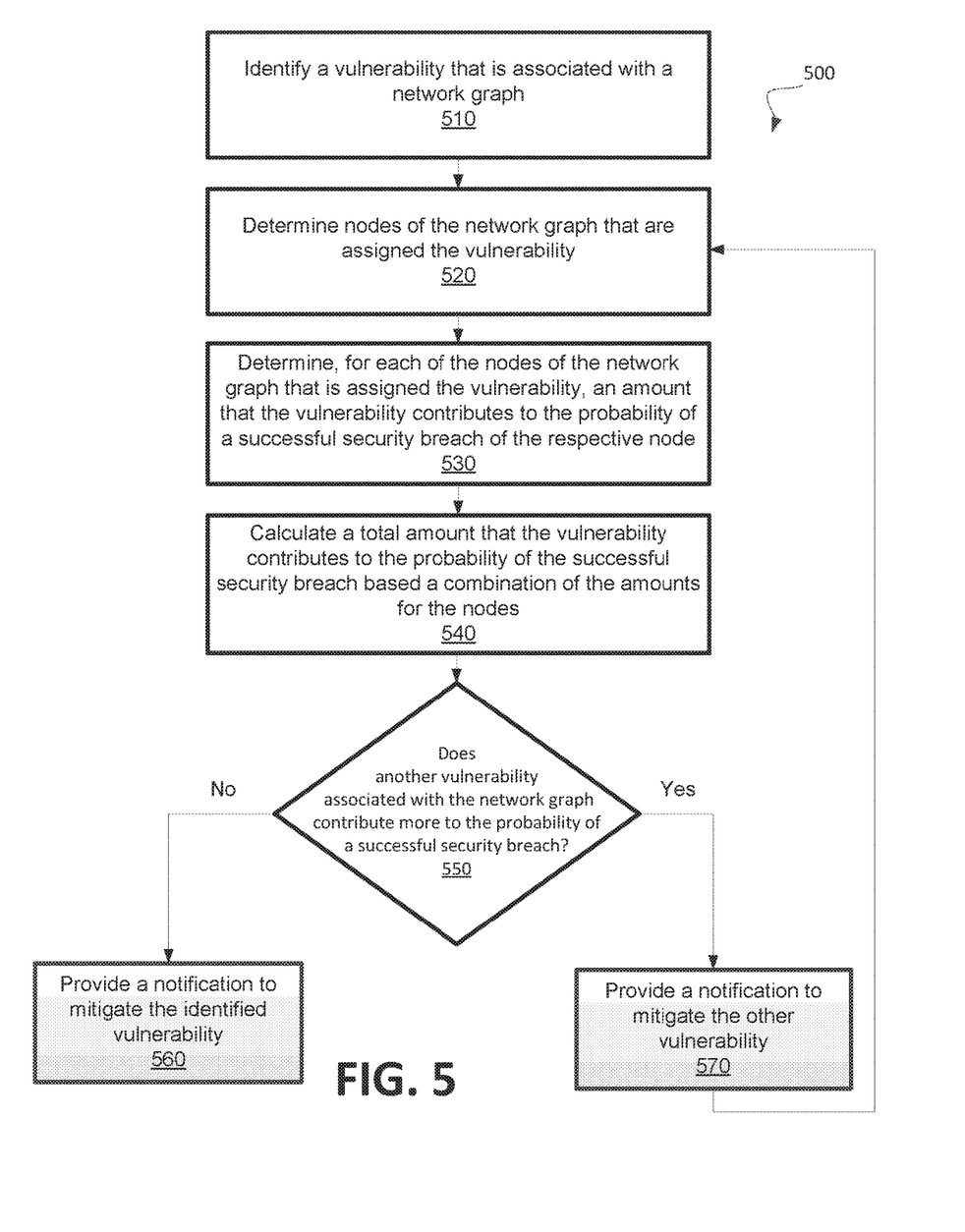
FIG. 5 is an example method to generate a notification to mitigate a vulnerability for an asset of a network infrastructure by using a network graph in accordance with some embodiments.

FIG. 5 is an example method 500 to identify a vulnerability of an asset to be mitigated by using a network graph. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. The security recommendation component 135 of FIG. 1 may perform the method 500.

As shown in FIG. 5, the method 500 may begin with the processing logic identifying a vulnerability that is assigned to a node of a network graph (block 510). For example, the vulnerability may be assigned to an asset that is represented by the node of the network graph that represents a network infrastructure that includes the asset. The vulnerability may be identified based on a request or a query from a user (e.g., an administrator of the network infrastructure) to assess security of the network infrastructure. In some embodiments, the request may be to identify a vulnerability assigned to one or more nodes of the network graph that contributes more to a probability of a successful security breach of the network infrastructure that is represented by the network graph. In some embodiments, the vulnerability may be identified from a portion of the network graph. For example, the request may correspond to an identification of a vulnerability that is associated with a node that is included in a portion of the network graph (e.g., a node that has an ancestor node that corresponds to a particular entity).

The processing logic may further determine nodes of the network graph that are assigned the identified vulnerability (block 520). For example, each node that includes an identification that indicates that the vulnerability is included with the asset that is represented by the node may be identified. Thus, each asset that has a software or hardware flaw corresponding to the vulnerability that may be exploited to result in a successful security breach may be identified. The processing logic may further determine, for each of the nodes of the network graph that is associated with the identified vulnerability, an amount that the vulnerability contributes to the probability of a successful security breach of the respective node (block 530). For example, a value or score may be assigned to each vulnerability. In some embodiments, the value or score that is assigned to a vulnerability may be based on a type of asset that is associated with the vulnerability. For example, a particular software vulnerability may be associated with different types of assets (e.g., a server and a mobile device). The vulnerability may be assigned a different score based on the type of asset that is associated with the vulnerability. For example, a server may be associated with the vulnerability that is assigned a first value and a mobile device may be associated with the same vulnerability, but the vulnerability assigned to the mobile device may be assigned a second value that is different than the first value. As previously described, the value or score that is assigned to the vulnerability may be used in a conditional probability table for the node in the network graph that is used to generate an assessment of a security breach for the node.

Referring to FIG. 5, the processing logic may further determine a total amount that the vulnerability contributes to the probability of a successful security breach based on a combination of the amount for each of the identified nodes (block 540). For example, an aggregate of the amounts that the vulnerability contributes to the probability of the successful security breaches for each of the nodes may be summed, added, or combined. Thus, a total amount that the vulnerability contributes to the probability of a successful security breach across the assets represented by nodes of the network graph may be calculated. For example, the values of the vulnerability across each of the nodes may be added or combined. The processing logic may further determine whether another vulnerability associated with one or more nodes of the network graph contributes more to the probability of the successful security breach than the identified vulnerability (block 550). If the other vulnerability does not contribute more to the probability of the successful security breach, then the identified vulnerability may be provided as a vulnerability of the network infrastructure that is to be mitigated (block 560). For example, a notification may be provided to a user or administrator of the network infrastructure to identify that the vulnerability contributes the most to the probability of a successful security breach of the assets of the network infrastructure. Otherwise, if the other vulnerability contributes more to the probability of the successful security breach, then the processing logic may provide the other vulnerability as a vulnerability of the network infrastructure that is to be mitigated (block 570). For example, the processing logic may return to determine the nodes of the network graph that are assigned the other vulnerability as described in conjunction with block 520. In some embodiments, a recommendation of a control to be applied to mitigate the vulnerability may be provided as described in further detail with regards to FIG. 6.

As an example, a first vulnerability may contribute a large amount to the probability of a successful security breach of one asset of the network infrastructure. A second vulnerability may contribute a small amount to the probability of a successful security breach for multiple assets of the network infrastructure. If the aggregation of the small amount of the contribution to each of the multiple assets of the network infrastructure exceeds the large amount of the contribution to the one asset of the network infrastructure, then mitigating the second vulnerability may enhance the security of the network infrastructure more than the mitigation of the first vulnerability.

Although the above disclosure describes identifying the vulnerability that contributes the most to the probability of a successful security breach, other types of vulnerabilities may also be identified based on different conditions to identify a particular vulnerability. For example, as previously described, each node may be associated with an impact value or score and the joint probability function may be used to identify the impact of a successful security breach for a particular node. A vulnerability may be identified based on the impact of the successful security breach. For example, a request may be to identify a vulnerability that contributes the most to the probability of a successful security breach between nodes that are associated with an impact above a threshold value. In some embodiments, the vulnerability may be identified as the vulnerability that contributes the most to the probability of a successful security breach for nodes of a portion of the network graph (e.g., nodes under a particular ancestor node such as an entity node). In the same or alternative embodiments, the request may be to identify a vulnerability that contributes the most to the impact of a successful security breach (e.g., based on a financial impact to a particular business). Furthermore, the request may be to identify a control that may reduce a value in a conditional probability table more than one or more other controls or any other available control.

Figure 6:
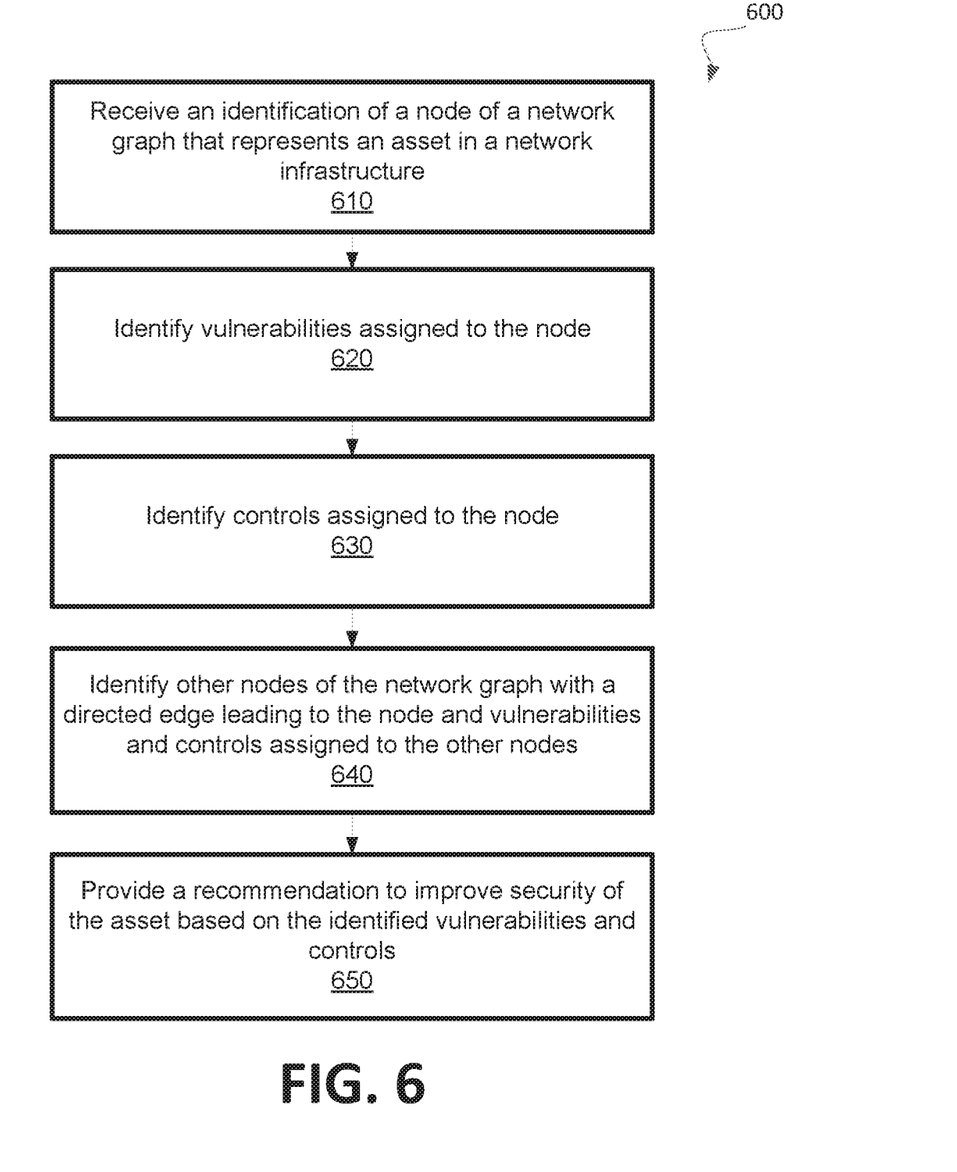
FIG. 6 is an example method to provide a recommendation to improve security of an asset by using a network graph in accordance with some embodiments.

FIG. 6 is an example method 600 to provide a recommendation to improve security of an asset by using a network graph. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. The security recommendation component 135 of FIG. 1 may perform the method 600.

As shown in FIG. 6, the method 600 may begin with the processing logic receiving an identification of a node of a network graph that represents an asset in a network infrastructure (block 610). Furthermore, the processing logic may identify vulnerabilities that are assigned to the node (block 620) and controls that are assigned to the node (block 630). Subsequently, the processing logic may identify other nodes of the network graph with a directed edge leading to the node and vulnerabilities and controls assigned to the other nodes (block 640). For example, each node that is in a path of the identified node in the network graph may be identified. Thus, each ancestor node of the identified node may be identified and the vulnerabilities and controls of each of the ancestor nodes may be identified. The processing logic may provide a recommendation to improve the security of the asset based on the identified vulnerabilities and controls (block 650). For example, a control that is available to mitigate the identified vulnerability may be selected. In some embodiments, the available control may be based on the nodes that are assigned the identified vulnerability. For example, each type of node may correspond to a particular number of available controls. A control that is available for the most number of nodes of the nodes that are assigned the identified vulnerability may be selected to be included in the recommendation to improve the security of the asset. In some embodiments, each of the available controls may reduce a value corresponding to the vulnerability by a particular amount. The available control that reduces the value of the corresponding vulnerability the most or more than another available control may be selected to be included in the recommendation. In some embodiments, the recommendation may identify the selected control and the assets that are represented by the nodes that are assigned the selected control to mitigate the identified vulnerability.

Figure 7:
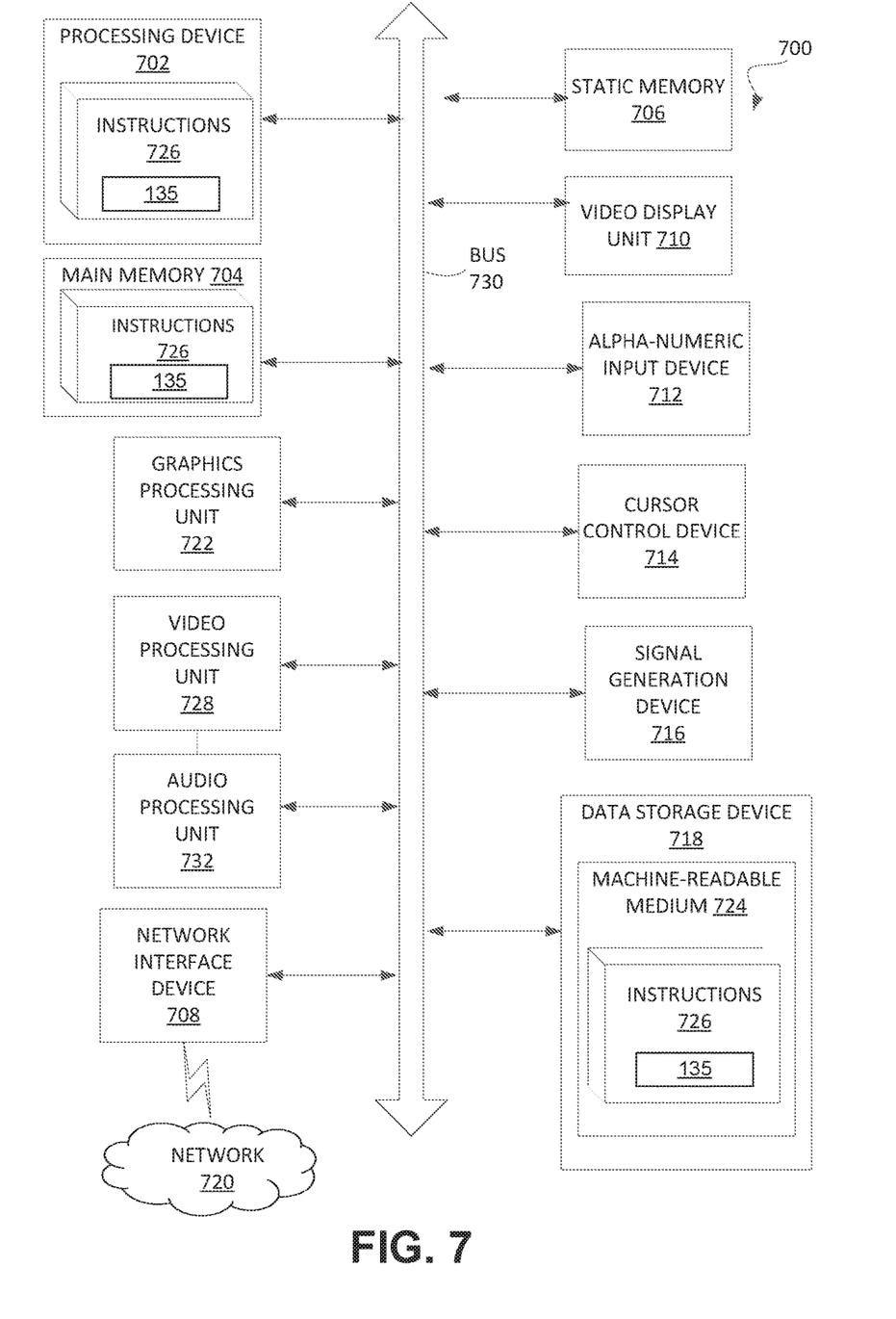
FIG. 7 is a block diagram of an example computer system operating in accordance with the disclosure described herein.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 608 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the security recommendation component (e.g., security recommendation component 135 of FIG. 1). While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   identifying a first vulnerability that is associated with one or more nodes of a network graph that represent one or more assets of a network infrastructure;
   identifying a second vulnerability that is associated with one or more nodes of the network graph that represent one or more assets of the network infrastructure;

determining, by a processing device, whether the first vulnerability or the second vulnerability contributes more to a probability of a security breach associated with the network infrastructure by:
  determining a first group of nodes of the network graph that are assigned the first vulnerability and a second group of nodes of the network graph that are assigned the second vulnerability;
  receiving a first value assigned to each node of the first group of nodes of the network graph that is assigned the first vulnerability and a second value assigned to each node of the second group of nodes of the network graph that is assigned the second vulnerability;
  modifying a first group of conditional probability tables for each node of the first group of nodes by reducing values of the first group of conditional probability tables based on the first value; and
  modifying a second group of conditional probability tables for each node of the second group of nodes by reducing values of the second group of conditional probability tables based on the second value; and
providing a notification of a hardware change or a software change associated with the one or more assets of the network infrastructure to mitigate the vulnerability that contributes more to the probability of the security breach associated with the network infrastructure.

2. The method of claim 1, wherein the determining of whether the first vulnerability or the second vulnerability contributes more to the probability of the security breach further comprises:
  calculating a first probability of the successful security breach when the first group of conditional probability tables are modified by using a joint probability function with the network graph and a second probability of the successful security breach when the second group of conditional probability tables are modified by using the joint probability function with the network graph.

3. The method of claim 1, wherein the first value and the second value each correspond to a characteristic of the respective first or second vulnerability and a type of asset corresponding to the respective node.

4. The method of claim 1, further comprising:
  identifying a control to mitigate the vulnerability that contributes more to the probability of the security breach, wherein the control is based on the one or more nodes of the network graph that are associated with the vulnerability that contributes more to the probability of the security breach associated with the network infrastructure.

5. The method of claim 4, wherein the control corresponds to a software or hardware change to the one or more assets of the network infrastructure that are represented by the one or more nodes of the network graph that are associated with the vulnerability that contributes more to the probability of the security breach.

6. The method of claim 1, wherein the network graph is a Bayesian network.

7. A non-transitory computer readable medium comprising instructions that, when executed by a processing device, cause the processing device to perform operations comprising:
  identifying a first vulnerability that is associated with one or more nodes of a network graph that represent one or more assets of a network infrastructure;
  identifying a second vulnerability that is associated with one or more nodes of the network graph that represent one or more assets of the network infrastructure;
  determining whether the first vulnerability or the second vulnerability contributes more to a probability of a security breach associated with the network infrastructure by:
    determining a first group of nodes of the network graph that are assigned the first vulnerability and a second group of nodes of the network graph that are assigned the second vulnerability;
    receiving a first value assigned to each node of the first group of nodes of the network graph that is assigned the first vulnerability and a second value assigned to each node of the second group of nodes of the network graph that is assigned the second vulnerability;
    modifying a first group of conditional probability tables for each node of the first group of nodes by reducing values of the first group of conditional probability tables based on the first value; and
    modifying a second group of conditional probability tables for each node of the second group of nodes by reducing values of the second group of conditional probability tables based on the second value; and
  providing a notification of a hardware change or a software change associated with the one or more assets of the network infrastructure to mitigate the vulnerability that contributes more to the probability of the security breach associated with the network infrastructure.

8. The non-transitory computer readable medium of claim 7, wherein to determine whether the first vulnerability or the second vulnerability contributes more to the probability of the security breach, the operations further comprise:
  calculating a first probability of the successful security breach when the first group of conditional probability tables are modified by using a joint probability function with the network graph and a second probability of the successful security breach when the second group of conditional probability tables are modified by using the joint probability function with the network graph.

9. The non-transitory computer readable medium of claim 7, wherein the first value and the second value each correspond to a characteristic of the respective first or second vulnerability and a type of asset corresponding to the respective node.

10. The non-transitory computer readable medium of claim 7, the operations further comprising:
  identifying a control to mitigate the vulnerability that contributes more to the probability of the security breach, wherein the control is based on the one or more nodes of the network graph that are associated with the vulnerability that contributes more to the probability of the security breach associated with the network infrastructure.

11. The non-transitory computer readable medium of claim 10, wherein the control corresponds to a software or hardware change to the one or more assets of the network infrastructure that are represented by the one or more nodes of the network graph that are associated with the vulnerability that contributes more to the probability of the security breach.

12. The non-transitory computer readable medium of claim 7, wherein the network graph is a Bayesian network.

13. A system comprising:
a memory; and
a processing device, operatively coupled with the memory, to:
identify a first vulnerability that is associated with one or more nodes of a network graph that represent one or more assets of a network infrastructure;
identify a second vulnerability that is associated with one or more nodes of the network graph that represent one or more assets of the network infrastructure;
determine whether the first vulnerability or the second vulnerability contributes more to a probability of a security breach associated with the network infrastructure by:
 determining a first group of nodes of the network graph that are assigned the first vulnerability and a second group of nodes of the network graph that are assigned the second vulnerability;
 receiving a first value assigned to each node of the first group of nodes of the network graph that is assigned the first vulnerability and a second value assigned to each node of the second group of nodes of the network graph that is assigned the second vulnerability;
 modifying a first group of conditional probability tables for each node of the first group of nodes by reducing values of the first group of conditional probability tables based on the first value; and
 modifying a second group of conditional probability tables for each node of the second group of nodes by reducing values of the second group of conditional probability tables based on the second value; and
provide a notification of a hardware change or a software change associated with the one or more assets of the network infrastructure to mitigate the vulnerability that contributes more to the probability of the security breach associated with the network infrastructure.

14. The system of claim 13, wherein to determine whether the first vulnerability or the second vulnerability contributes more to the probability of the security breach, the processing device is further to:
 calculate a first probability of the successful security breach when the first group of conditional probability tables are modified by using a joint probability function with the network graph and a second probability of the successful security breach when the second group of conditional probability tables are modified by using the joint probability function with the network graph.

15. The system of claim 13, wherein the first value and the second value each correspond to a characteristic of the respective first or second vulnerability and a type of asset corresponding to the respective node.

16. The system of claim 13, wherein the processing device is further to:
 identify a control to mitigate the vulnerability that contributes more to the probability of the security breach, wherein the control is based on the one or more nodes of the network graph that are associated with the vulnerability that contributes more to the probability of the security breach associated with the network infrastructure.

17. The system of claim 16, wherein the control corresponds to a software or hardware change to the one or more assets of the network infrastructure that are represented by the one or more nodes of the network graph that are associated with the vulnerability that contributes more to the probability of the security breach.

* * * * *